United States Patent [19]

Grein-Wiegand

[11] Patent Number: 4,873,113

[45] Date of Patent: Oct. 10, 1989

[54] PROCESS FOR THE PRODUCTION OF EXTENDABLE THERMOGRAPHIC PLATES

[75] Inventor: Aleide Grein-Wiegand, Wanfriedwerra, Fed. Rep. of Germany

[73] Assignee: Varnel Chemical Business S.A., Switzerland

[21] Appl. No.: 151,564

[22] Filed: Feb. 2, 1988

[30] Foreign Application Priority Data

Feb. 16, 1987 [CH] Switzerland .................... 00564/87

[51] Int. Cl.⁴ .................... B05D 5/00; B05D 7/02
[52] U.S. Cl. .................... 427/2; 350/351; 427/282
[58] Field of Search .................... 427/2, 282; 350/351; 128/736

[56] References Cited

U.S. PATENT DOCUMENTS 4,501,503 2/1985 Buirly et al. .................... 350/351 X

*Primary Examiner*—Evan Lawrence
*Attorney, Agent, or Firm*—Kane, Dalsimer, Sullivan, Kurucz, Levy, Eisele and Richard

[57] ABSTRACT

A process for the production of extendable thermographic plates for matching the curvatures of the human body when thermography is carried out. In the process, a capsular ink formulation based on microencapsulated liquid crystals is applied by screen printing an elastomer plate of natural latex, the formulation being elastic and including, as a binder, a solution of polyvinyl alcohol modified by the addition of an inorganic cobalt salt which confers elasticity, and stability of the color-change temperatures of the liquid crystals.

5 Claims, No Drawings

PROCESS FOR THE PRODUCTION OF EXTENDABLE THERMOGRAPHIC PLATES

FIELD OF THE INVENTION

This invention relates to a process for the production of extendable thermographic plates, which could not be produced unitl now by the use of production methods which are currently employed.

PRIOR ART

As everybody knows, for many years now thermography has been employed as a system of diagnosis, in which a range of complaints can be detected by measuring differences in temperature between various regions of the body, the measurement being carried out by inspecting the change in the colour of layers of liquid crystals placed in contact with the body.

Originally the liquid crystals were deposited on rigid support plates and these later gave way to flexible plates which adhere better to the body, but which do not yet represent the best solution, given that even a flexible plate does not adhere perfectly to the complex curvatures of the human body, and hence the problem was that of producing plates which were not only flexible but also extendable.

In order to solve this problem, thoughts turned first to liquid crystals which were not microencapsulated, given that microcapsules in general are not elastic, being quite rigidenclosures, but tests with liquid crystals which were not microencapsulated have confirmed the impossibility of following this route, particularly owing to the major degradation which unprotected liquid crystals undergo and owing to other serious disadvantages which arise both at the production stage and at the use stage.

Attention turned therefore to the possiblity of employing microencapsulated liquid crystals and it has been verified that microencapsulated liquid crystals, introduced in suitably formulated vehicles and with additives, form a foam which is sufficiently elastic to be deposited on a support elastomer, but on condition that specified relationships between the vehicle and the microcapsules are observed, since outside such an optimum relationship excessively pale colours of the microencapsulated liquid crystals or a lack of plate elasticity are obtained. Even when the degree of final elasticity which can be obtained is not very high, given that the microcapsules are, after all, rigid bodies, it is completely sufficient to produce the desired elastic plates.

As everybody knows, in order to enable the microencapsulated liquid crystals to be applied onto a support it is also necessary to apply an adhesive layer and a black base layer which creates the required background contrast for reading the thermographic map, and all these materials must therefore be elastic like the support plate and compatible with each other in order to be capable of achieving the objectives of this invention.

Thus, in order to make it possible to arrive at the formation of an extendable plate suitable for the purpose it has been necessary to solve a large number of problems which may be summarized like this: the formulation of the elastomer forming the support must be such that it can be pigmented black and that its viscosity can be modified, it must exhibit reduced foam formation, it must adhere sufficiently to the working support but without becoming adhesively bonded to the latter, in order to be capable of being easily taken off after the hardening of the coating, it must be receptive to the microencapsulated liquid crystals, which must therefore be deposited well without forming craters and it must not undergo elasticity changes before, during and after the work.

Furthermore, the extendable thermographic plate must offer the physician an absolute certainty of reproducibility of performance and it is necessary therefore that the microencapsulated liquid crystals have color-transition temperatures which are absolutely constant, and this was virtually impossible to obtain on the elastomers with the usual formulations.

After numerous experiments, it has been found that the elastomer which gives the best results as a support is natural latex, that is to say the starting material which is already normally employed for various applications in the medical field, such as surgeon's gloves and so on, whereas artificial elastomers with an aqueous base such as aqueous emulsions based on vinyl, polyurethane and similar resins, although theoretically also capable of being employed, have not given results which are better than those obtained with natural latex. However this invention envisages in general the use of elastomers with an aqueous base, even if the embodiment which is by far preferred at present is natural latex.

SUMMARY OF THE INVENTION

In order to solve the basic problem of the stability of color-change temperatures in the liquid crystals, it has surprisingly been found after prolonged experimentation, and this is a fundamental feature of the invention, that this stability is achieved by the use, as a binder for the capsulator ink, of a solution of polyvinyl alcohol modified by the addition of an inorganic cobalt salt, which enables a good elasticity to be attained without modifying the structure or the performance of the liquid crystals, since the cobalt salt absorbs water and keeps the film moist and hence guarantees its elasticity and its unchangeability; in this manner it satisfies the main quality needed for thermography, that is to say the reliability of reading of the results.

The other basic problem to be solved was that of the system for application of the microencapsulated liquid crystals onto the elastomer support, since with the use of conventional techniques neither application by screen printing nor that in a thin layer had yielded appreciable results and, more particularly, screen printing because of the formation of foam resisting the common antifoam agents and the thin layer owing to the degree of density of the formulation being insufficient to maintain the continuity of the layer. Both these problems have been spectacularly solved in an unpredictable manner by an average specialist in the field.

In the case of screen printing it has surprisingly been found that the addition of dioctyl sodium sulphosuccinate in a very low dosage to the capsular ink acts as an antifoam and as a wetting agent and restructures any craters which are formed in the layer of microencapsulated liquid crystals. In the case of the thin layer, on the other hand, it has been possible to increase the viscosity by the addition of a derivative of succinic acid at the drying stage. By this means, the two conventional systems for applying microencapsulated liquid crystals have been successfully employed in order to obtain the extendable plates according to this invention.

DESCRIPTION OF THE PREFERRED EMBODIMENT

The formulation of the capsular ink, that is to say the composition which contains the microencapsulated liquid crystals, generally contains a percentage of microcapsules which is lower than normal, given that it is necessary quantitatively to promote the presence of the elastic binder vehicle which cannot drop below a certain percentage, and for this reason use is preferably made of synthetic liquid crystals which have superior brightness, although it is also possible to employ the traditional cholesterol-based liquid crystals.

The detailed description of a practical example of embodiment of extendable thermoplastic plates using screen printing, which illustrates the method according to this invention, follows; nevertheless it should be understood that this example is given purely by way of explanation and without limiting the scope of the invention in any way.

EXAMPLE

Natural latex plates with an average thickness of 120 to 250 microns are carefully washed with water and soap, in order to remove the talcum powder and any impurities which may be present, and are then dried. A soft adhesive of the following composition is now applied by means of screen printing onto methyl methacrylate (Plexiglas) plates: 3 parts of a cellulose-based transparent screen printing varnish (Celloflex), 1 part of adhesive screen printing varnish (Argonstick), diluent, as much as is reuired (mixture of toluene and xylene), if need be, a silicone-based antifoam (SAG) in a very small amount, 1 or 2 drops per kg. A single pass is carried out on a screen printing cloth with 77 threads.

The latex plates are then placed on the Plexiglas plates by means of a coupler for plastic films (Mylar). Carbon black for screen printing, such as for example Colortex LP (black screen printing ink), optionally diluted with the minimum quantity of water if desired, is now applied with a screen printing frame having 43 threads, with at least two passes with an intermediate drying for at least 7 hours; several passes are recommended for a better degree of coverage.

At this point the application of the microencapsulated liquid crystals may be carried out using screen printing with the following formulation: standard BDH capsular ink (microencapsulated synthetic liquid crystals): 2 parts, cobalt binder: 1 part, glycerine (emollient): 3%, dioctyl sodium sulphosuccinate, 10% strength solution: 4-8 drops per kg.

The cobalt binder in its turn consists of 60% of a 13% strength solution of polyvinyl alcohol (Mowiol 20-98) and of 40% of cobalt nitrate. A screen printing process with 43 threads is employed and five double screen printing passes are performed. A double screen printing pass means two consecutive screen printing passes without intermediate drying and without removal of the printing support. The three first double passes may be carried out after normal oven drying, whereas the last two passes should be performed following at least 12 hours from one to the other, in order to avoid a viscosity of the deposition of liquid crystals, which may give rise to problems of separation from the frame with a resultant formation of foam or of irregularities of another nature.

The plates obtained in this manner exhibit very good stability with time, a strict change tolerance of ±0.5° C., good color and brightness of the microencapsulated liquid crystals and good elasticity, and they must be stored on the Plexiglas plates with the interposition of 4 spacing wedges placed at the corners so that the plates do not come into contact with each other.

It should be noted that it would be possible to employ natural latex painted black beforehand with the addition of an oqaque black to the mixtures, such as lampblack, and the deposition of the contrasting background black layer by screen printing could be saved in this manner. The thin-layer deposition can be performed with the methods and formulations which are similar to those mentioned hereinbefore, but with the additional operation of adding a succinic acid derivative (ester or ether) during the drying stages and especially during the first two hours, in order to raise the viscosity of the capsular ink, which otherwise would not successfully produce a layer having the required density and continuity.

Finally, it is necessary to emphasise the fact that numeous alternative forms, modifications, additions and/or replacements of the working components and of the constituents may be introduced into the method of this invention, without thereby departing either from its spirit or its purpose and without even departing from its scope of protection, as defined, furthermore, in the attached claims.

What is claimed is:

1. A process for producing an extendable thermographic plate by applying a capsular ink formulation based on microencapsulated liquid crystals by screen printing an elastomer plate of natural latex, the said formulation being made elastic by means of vehicles and additives which impart stability and elasticity including , as a binder, a solution of polyvinyl alcohol modified by the addition of an inorganic cobalt salt, which confers elasticity, and stability of the color-change temperatures of the liquid crystals.

2. A process as claimed in claim 1, wherein the inorganic cabalt salt is cabalt nitrate, employed in the binder in a proportion of 40% with 60% of 13% strength solution of polyvinyl alcohol.

3. The process of claim 1, comprising adding dioctyl sodium sulphosuccinate in a very low dosage as an antifoam and wetting agent in order to impart uniformity to the layer and to prevent foam formation, to the capsular ink formulation.

4. The process of claim 1, comprising adding a succinic acid derivative during a plate drying stage, in order to increase the viscosity of the capsular ink.

5. A process as claimed in claim 1, wherein the microencapsulated liquid crystals are of the synthetic type.

* * * * *